United States Patent
Grobe et al.

(10) Patent No.: US 12,492,923 B2
(45) Date of Patent: Dec. 9, 2025

(54) BEARING COMPONENT FOR FLOW SENSOR, FLOW MEASURING UNIT, AND DOMESTIC APPLIANCE

(71) Applicant: STIEBEL ELTRON GMBH & CO. KG, Holzminden (DE)

(72) Inventors: Michael Grobe, Hoexter (DE); Steffen Klie, Lobach (DE); Stefan Engelke, Hoexter (DE)

(73) Assignee: STIEBEL ELTRON GMBH & CO. KG, Holzminden (DE)

( * ) Notice: Subject to any disclaimer, the term of this patent is extended or adjusted under 35 U.S.C. 154(b) by 158 days.

(21) Appl. No.: 18/024,659

(22) PCT Filed: Aug. 2, 2021

(86) PCT No.: PCT/EP2021/071544
§ 371 (c)(1),
(2) Date: Mar. 3, 2023

(87) PCT Pub. No.: WO2022/048840
PCT Pub. Date: Mar. 10, 2022

(65) Prior Publication Data
US 2023/0314191 A1    Oct. 5, 2023

(30) Foreign Application Priority Data
Sep. 4, 2020 (DE) .......................... 102020123219.5

(51) Int. Cl.
*G01F 1/06* (2006.01)
(52) U.S. Cl.
CPC ..................................... *G01F 1/06* (2013.01)

(58) Field of Classification Search
CPC ............... G01F 1/05; G01F 1/053; G01F 1/06
See application file for complete search history.

(56) References Cited

U.S. PATENT DOCUMENTS

| | | | | |
|---|---|---|---|---|
| 4,172,381 A | * | 10/1979 | Aigner | G01F 1/065 73/861.87 |
| 9,341,391 B2 | * | 5/2016 | Stebbins | F24H 15/37 |
| 9,573,828 B2 | * | 2/2017 | Chason | C02F 1/505 |
| 2021/0246885 A1 | * | 8/2021 | Rohrmann | F16C 17/26 |

FOREIGN PATENT DOCUMENTS

WO    WO-2014005707 A1 *  1/2014  ............. F24H 1/121

OTHER PUBLICATIONS

Jansen et al., Control Circuit Board for a Continuous Flow Heater, Jan. 2014, FIT Machine Translation (Year: 2014).*

* cited by examiner

*Primary Examiner* — Erika J. Villaluna
(74) *Attorney, Agent, or Firm* — Brooks Kushman P.C.

(57) ABSTRACT

A bearing component of a flow sensor of a domestic appliance has a rotary axle which, in the installed state, is oriented so as to be substantially perpendicular to a flow direction of a fluid channel of the domestic appliance. The flow sensor has a first bearing at each of the opposing ends of the rotary axle, two opposing second bearings being contained in the bearing component. The two second bearings are spaced apart from one another in such a way that, in one state of the bearing component, they are engaged with the first bearings of the flow sensor, at least one arm of the bearing component being elastic, so that a distance between the second bearings can be increased in order to insert the flow sensor between the second bearings.

20 Claims, 12 Drawing Sheets

BEARING COMPONENT FOR FLOW SENSOR, FLOW MEASURING UNIT, AND DOMESTIC APPLIANCE

CROSS-REFERENCE TO RELATED APPLICATIONS

This application is a U.S. National Phase of PCT Application No. PCT/EP2021/071544 filed Aug. 2, 2021, which claims priority to German Patent Application No. 102020123219.5, filed Sep. 4, 2020, the disclosure of which is hereby incorporated in its entirety by reference herein.

TECHNICAL FIELD

The present invention relates to a bearing for a flow sensor of a domestic appliance, a flow meter of a domestic appliance, and a domestic appliance.

BACKGROUND

In domestic appliances or household appliances with a liquid supply, such as instantaneous water heaters, it is necessary to be able to determine the flow rate of the liquid through the household appliance or domestic appliance. This is may be achieved using a flow sensor.

DE 10 2008 043 613 A1 discloses a household appliance with a liquid supply. A flow sensor is provided in order to detect the flow rate through the household appliance. The flow sensor has an impeller that is provided in a housing. The housing is coupled to a liquid-conveying channel. The housing includes a base body and a lid.

DE 20 005 327 U1 discloses an instantaneous water heater having an impeller flow meter. An impeller is provided in a housing, which consists of a base body and a lid.

DE 20 2013 009 831 U1 discloses a domestic appliance with an impeller flow meter and a closure unit on a lid that enables installation of the flow sensor to be simplified.

Flow sensors, particularly impellers, are exposed to high loads over their service life. The impellers may be mounted in bearing shells that are provided for this purpose and are integral with the fluid channel in which the flow sensor determines the flow.

The housings of the flow units of domestic appliances, for example of instantaneous water heaters, may be made of fiber-reinforced, e.g., glass-fiber-reinforced, plastics in order to obtain the advantages associated with these materials. When the water is of poor quality, e.g., water with a high chloride content, increased wear and abrasion of the rotating impellers can occur, whereby the service life of the domestic appliance is shortened.

Against this background, proposed herein are flow sensors of domestic appliances the ensure high durability independent of water quality.

SUMMARY

According to one or more embodiments, a bearing component of a flow sensor, may be an impeller of a domestic appliance such as an instantaneous water heater. The flow sensor may have a rotary axle which, in the installed state, is oriented to be substantially perpendicular to a flow direction of a fluid channel of the domestic appliance. The flow sensor has a first bearing at each of the opposing ends of the rotary axle and two opposing second bearings being contained in the bearing component. The two second bearings are spaced apart from one another such that, in one state of the bearing component, they are engaged with the first bearings of the flow sensor, at least one arm of the bearing component being elastic, such that a distance between the second bearings can be increased in order to insert the flow sensor between the second bearings.

Advantageously, for the two ends of the rotary axle of the flow sensor, a second bearing is formed on one arm and a second bearing is formed opposite thereto on another arm. Furthermore, the arms advantageously correspond to an extension of the rotary axle of the flow sensor when the bearing component is in a relaxed state.

The bearing component ensures that the flow sensor, e.g., the impeller, is not directly mounted in the housing of the domestic appliance, e.g., an instantaneous water heater. The housings of some domestic appliances had polyamide or similar materials that are fiber-reinforced and consequently caused rapid abrasion of the flow sensor when exposed to water of poor quality. The poor water quality causes the fibers to be dislodged from the material, resulting in high abrasion of the flow sensor. In contrast, this invention has improved longevity at least by virtue of the fact that the bearing component is inventively arranged between the flow sensor and the housing of the domestic appliance, the flow sensor is mounted in the bearing component and not in the housing of the domestic appliance.

The one-piece design of the bearing component simplifies assembly. For example, the fact that at least one arm or the arms of the bearing component are elastic means that the impeller can be clamped between the arms, thereby preventing the flow sensor from falling out.

In some embodiments, the two arms are connected at a first end and at an opposing second end, the second bearings being disposed substantially centrally between the first end and the second end such that the distance between the second bearings is increased when a compressive force is applied between the first end and the second end.

The bearing component may be either open, such as in the form of headphones, or closed, such as in the form of a rhombus. In this embodiment, the two arms are connected at a first end and an opposing second end, being embodied, for example, in the form of a rhombus.

When two opposing ends of the arms are compressed toward each other in this case, the second bearings spread apart, so that there is sufficient room in the space between the second bearings of the two arms to accommodate the flow sensor. When the force applied to the ends of the arms is released, the second bearings return to their relaxed position, whereby the flow sensor is securely received between the second bearings. Compared to the open embodiment, i.e., a design in which the arms are connected to one another only at a first end and extend from there in different directions toward the second bearings, the mounting of the flow sensor in the bearing component is simplified in this embodiment.

The bearing component may be symmetrical around the rotary axle connecting the second bearings. This prevents incorrect assembly, for example, as a result of mirror-inverted insertion of the bearing component. Specifically, both directions of insertion are then possible in like manner.

According to one or more aspects of the invention, a flow assembly for a domestic appliance includes a bearing component as described according to the first aspect and a flow sensor, e.g., an impeller, having a rotary axle, the rotary axle of the flow sensor being received between axle receptacles of the bearing component.

Accordingly, the flow assembly can be inserted into the housing of the domestic appliance in a single step in the same manner. Since the bearing component securely receives the flow sensor between the second bearings of the arms, it is not possible for the flow sensor to fall out.

The material of the flow sensor may correspond to the material of the bearing component. Making the material of the bearing and of the bearing element the same makes reliable and high-quality support possible. For example, the sliding properties of the bearing are durable and do not involve rapid abrasion, as is the case, for example, when the bearing is mounted directly on the housing.

In some embodiments, at least one of the two components of the flow assembly (bearing component and flow sensor) contains a polyketone or consists thereof. Polyketone has been found to be especially resistant to waters of poor quality, such as those with high chlorine levels. Materials other than polyketone, such as POM for example, are also possible. In some embodiments, neither the bearing component nor the flow sensor has fibers to reinforce the material, as these can increase abrasion and reduce service life.

Further discloses is a domestic appliance, e.g., an instantaneous water heater. The domestic appliance may include a housing having a base body, a lid, and a channel. The domestic appliance further includes a flow assembly according to the invention. The base body and/or the lid has a receiving space for receiving the bearing component which is such that the flow sensor received in the bearing component extends at least partially into the channel when the bearing component is received in the receiving space.

The receiving space fixes the position of the bearing component relative to the channel. Accordingly, while the bearing component has a fixed position, the flow sensor mounted in the bearing component is able to rotate about the rotary axle with low friction and determine the flow rate through the channel.

The manufacturing concept of previous domestic appliances requires only minimal adaptation; the steps of inserting the flow sensor into the housing and closing the housing with the lid remain the same. Only the sensor component that is to be inserted is changed, namely in such a way that it already includes a bearing and is not mounted exclusively in the housing.

The lid may be designed to fix the bearing component that is received in the receiving space.

The housing may contain polyamide or consists thereof; for example, the housing contains fiber-reinforced polyamide or consists thereof. Polyamide, and particularly fiber-reinforced polyamide, is durable, heat-resistant, and thus especially suitable for domestic appliances, such as instantaneous water heaters.

Advantageously, the distance between the two opposing second bearings for the two ends of the rotary axle of the flow sensor can correspond to an extension of the rotary axle of the flow sensor, especially advantageously when the bearing component is in a relaxed state.

The bearing component may be prepared in a pretensioned state in order to receive the rotary axle, the bearing component then being inserted into the receiving space in an untensioned state after installation of the rotary axle.

Alternatively, the bearing component remains at least slightly tensioned even when the rotary axle is installed and is inserted into the receiving space in a tensioned state.

When inserted in the receiving space, the at least slightly pretensioned state of the bearing component advantageously remains, or the pretensioned state is advantageously released as a result of the insertion into the receiving space, with the bearing component engaging particularly in the receiving space.

In one embodiment, the bearing component is in a tensioned or untensioned state in the receiving space, with the rotary axle remaining largely untensioned in the bearing component, particularly axially. The distance between the second bearings is at least greater than/equal to the length of the rotary axle, the rotary axle being supported axially largely free of stress, advantageously without axial contact pressure from the second bearings.

The first bearing arrangement may be a bushing, and the second bearing arrangement may be a journal that rests in the bushing.

The first bearing may be a journal, and the second bearing arrangement may be a bushing. Here, the journal engages in the bushing.

Alternatively, both first bearings are embodied as journals, or both first bearings are embodied as bushings.

Alternatively, a first bearing is embodied as a journal and the opposing first bearing as a bushing, so the first bearings differ from one another. Correspondingly, one second bearing is then embodied as a bushing and the second bearing as a journal, so the second bearings also differ from one another. In that case, the impeller can only be inserted in a defined position.

The bearing component may be integrally connected to the receptacle or the base body of the instantaneous water heater, or it is injection-molded or integrally glued into the latter. In that case, at least one arm is elastically deformable and integrally contained in the receptacle or base body. The receptacle or the base body may contain polyketone at least in part, such as in the vicinity of the bearings, or the receptacle or the base body consists partly or entirely of polyketone.

If the receptacle and/or the base body consists partially of polyketone, then the receptacle or the base body may be made from a polyketone and another plastic by means of a two-component injection-molding process.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1A:
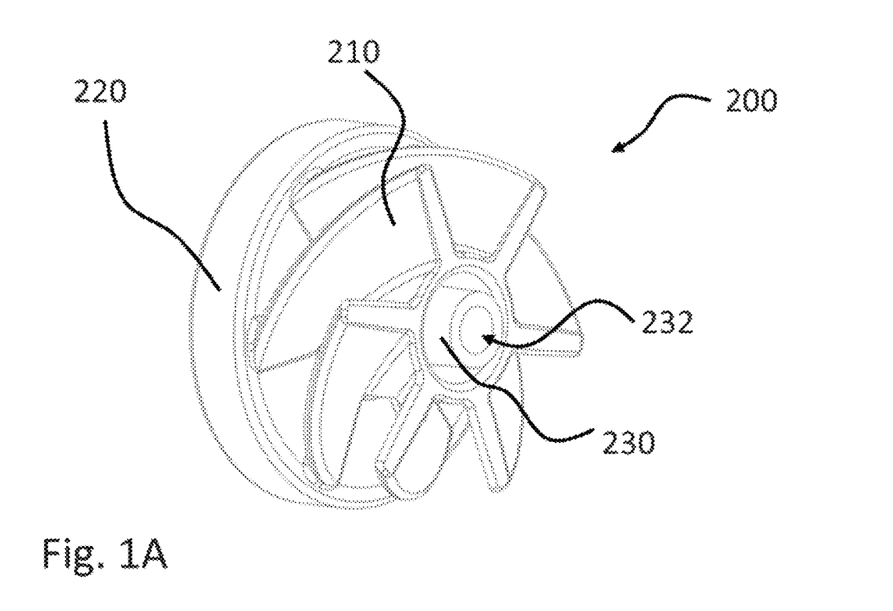
FIG. 1 shows a schematic and exemplary view of a flow sensor.
Figure 1B:
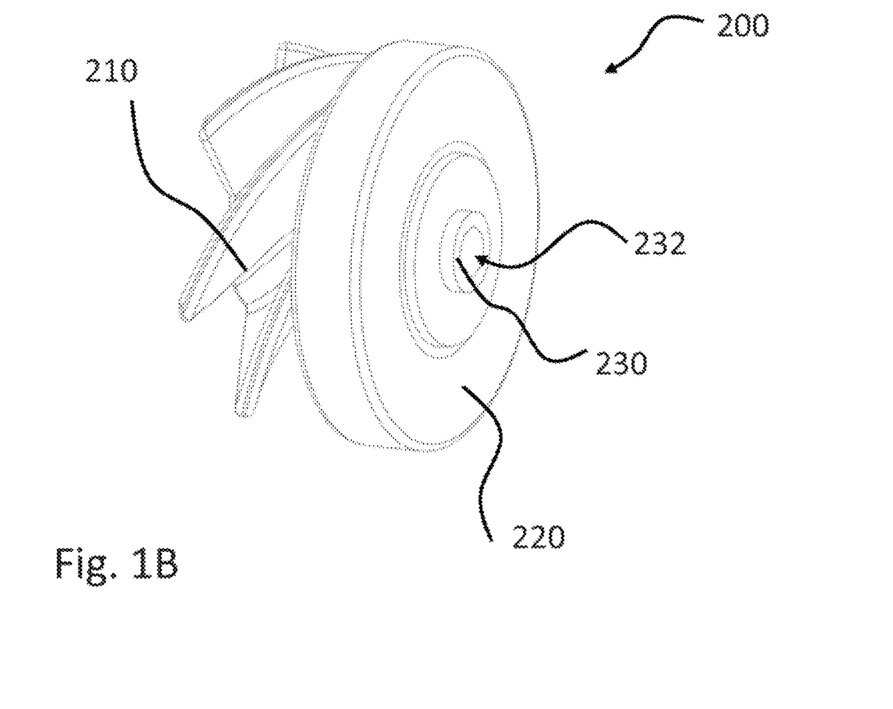
Figure 2:
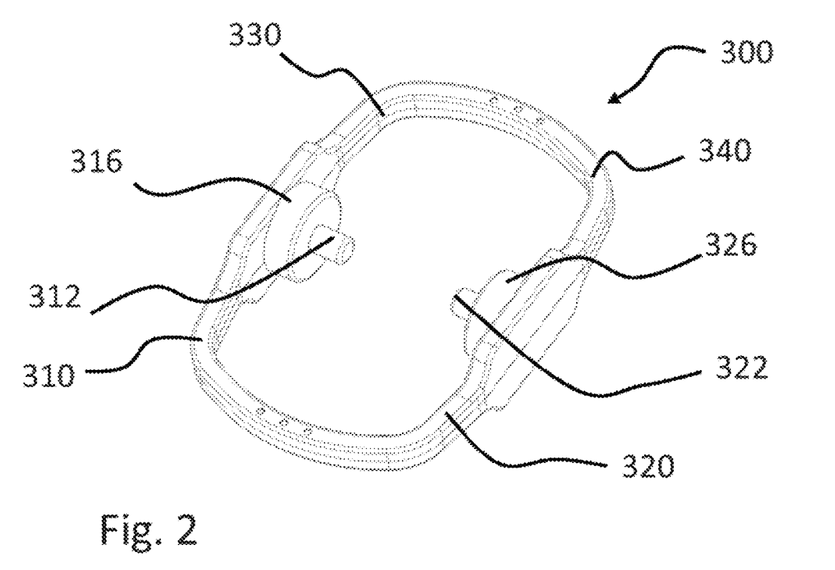
FIG. 2 shows a schematic and exemplary view of a bearing component according to the invention.

FIGS. 1A and 1B show schematic and exemplary views of a flow sensor 200 in the exemplary form of an impeller as it is used for determining the flow in an instantaneous water heater, for example. In this example, the flow sensor 200 has blade elements 210 and a magnetic element 220. By means of the blade elements 210, the flow sensor 200 rotates about a rotary axle 230. On both sides of the rotary axle 230, the flow sensor 200 has first bearings 232 that are designed to receive second bearings. FIG. 2 shows a schematic and exemplary view of a bearing component 300 for mounting a flow sensor 200 as shown in FIG. 1. FIG. 3 shows a schematic and exemplary view of the flow sensor 200 supported in the bearing component 300. The bearing component 300 has two arms 310 and 320, at each end of which is disposed a second bearing 312, 322.

The second bearings 312, 322 are designed to engage in the first bearings 232 of the flow sensor 200 or vice versa. In order to mount the flow sensor 200 in the bearing component 300, the arms 310,320 are spread apart, thereby increasing the distance between the second bearings 312 and 322. The flow sensor 200 can then be inserted between the second bearings 312, 322. Once released, the bearing component 300 returns to its original position, so that the flow sensor 200 is securely received within the bearing component 300.

In this example, in order to achieve secure fixation within the housing of the domestic appliance, the bearing component 300 further comprises two optional fixing collars 316, 326 that are adapted to the housing and may or may not differ from one another in other embodiments of the housing.

In this embodiment, the bearing component 300 is integrally made of a polyketone. Similarly, the flow sensor 200 is made of a polyketone. By virtue of the fact that the material of the flow sensor 200 and the bearing component 300 are the same, durable sliding properties of the axle mount and flow sensor 200 are ensured. In particular, the materials are preferably not fiber-reinforced in order to reduce abrasion in chlorinated waters.

In this example, the bearing component 300 has four arms 310, 320, 330, 340. The second bearings 312, 322 are each attached to two arms for the purpose of supporting the flow sensor 200. This results in a kind of closed ring of connected arms 310, 320, 330, 340 on which the optional fixing collars 316, 326 are formed. In other embodiments, a design with only two arms 310, 320 or 330, 340 is also conceivable, in which case, instead of a closed ring, only a semicircle is formed whose shape resembles a pair of headphones.

Figure 3A:
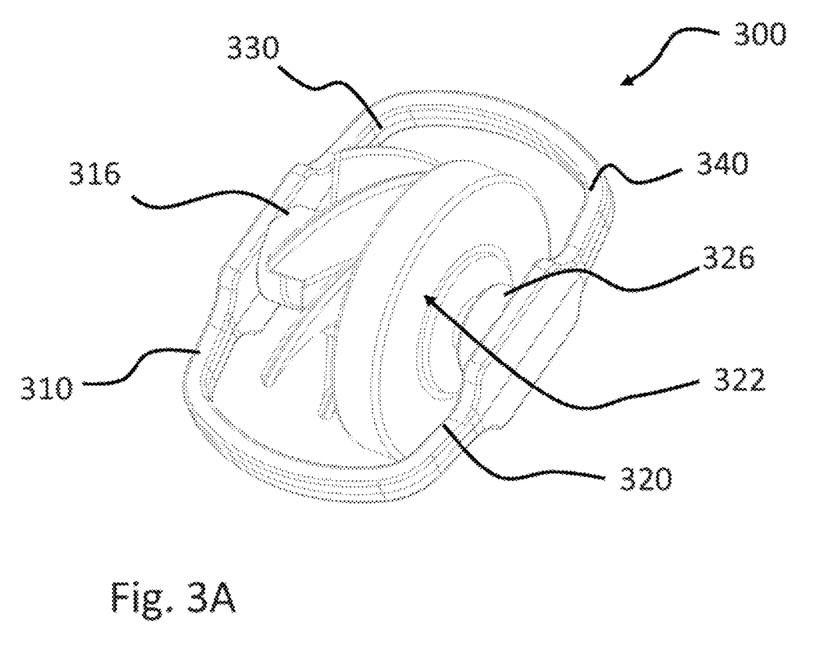
FIG. 3 shows a schematic and exemplary view of the bearing component with inserted flow sensor.
Figure 3B:
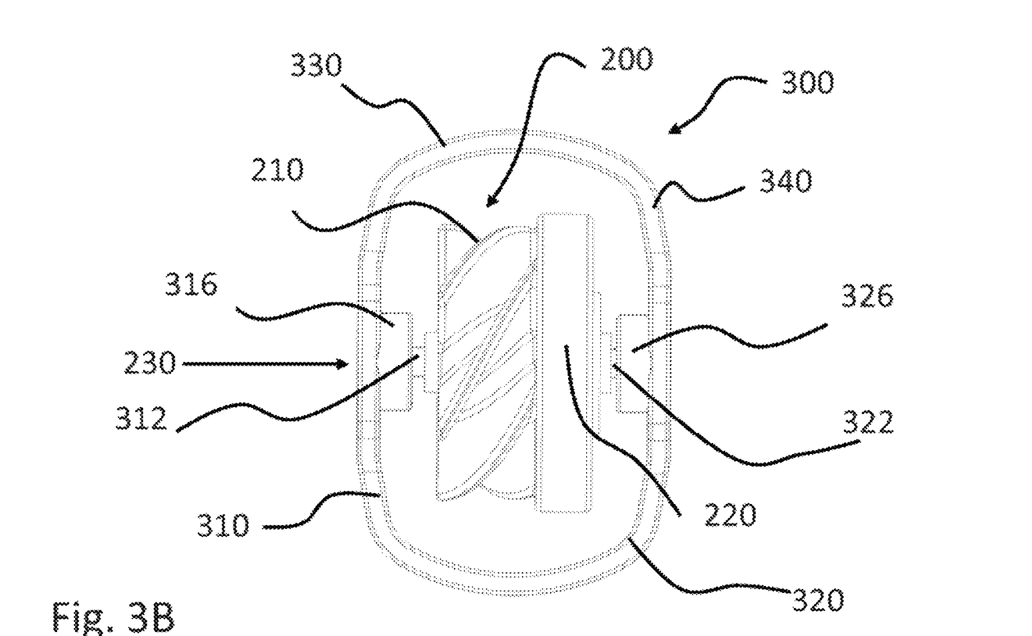
Figure 3C:
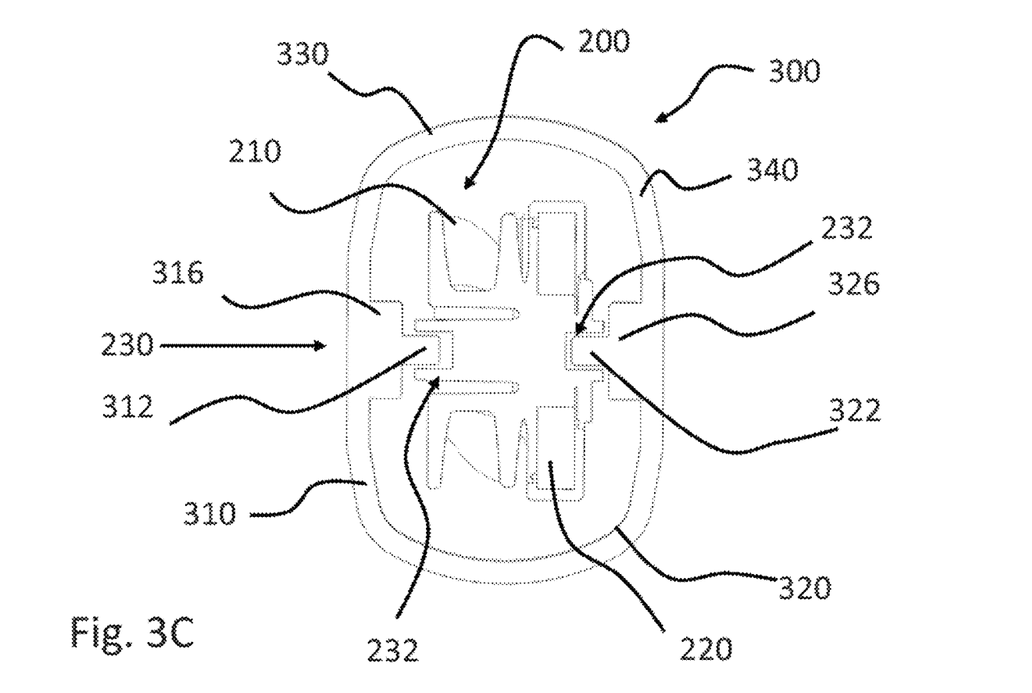

The arms 310, 320, 330, 340 are designed to be elastic or flexible so that the bearing component 300 can be pressed apart in an assembly process, particularly at the second bearings 312, 322, so that the flow sensor 200 fits between them and can be inserted into the bearing component 300. When the flow sensor 200 is inserted with its first bearings 232 into the second bearings 312, 322, the arms 310, 320, 330, 340 spring back again, and the flow sensor 200 is rotatably supported by the second bearings 312, 322. Thereafter, the bearing component 300 with the installed flow sensor 200 can be inserted into a receptacle 111 of the base body 100 of the instantaneous water heater (See FIG. 4). With the lid, the bearing component 300 is held in the base body 100 and the opening 112 is sealed in a watertight manner, so that the flow sensor 200 is at least partially mounted in the water channel of the domestic appliance, e.g., an instantaneous water heater. FIG. 3A shows the flow sensor 200 inserted into the bearing component 300 in a perspective view, FIG. 3B in plan view, and FIG. 3C in cross section, so that the second bearings 312, 322 as well as the first bearings 232 are clearly visible.

Figure 4:
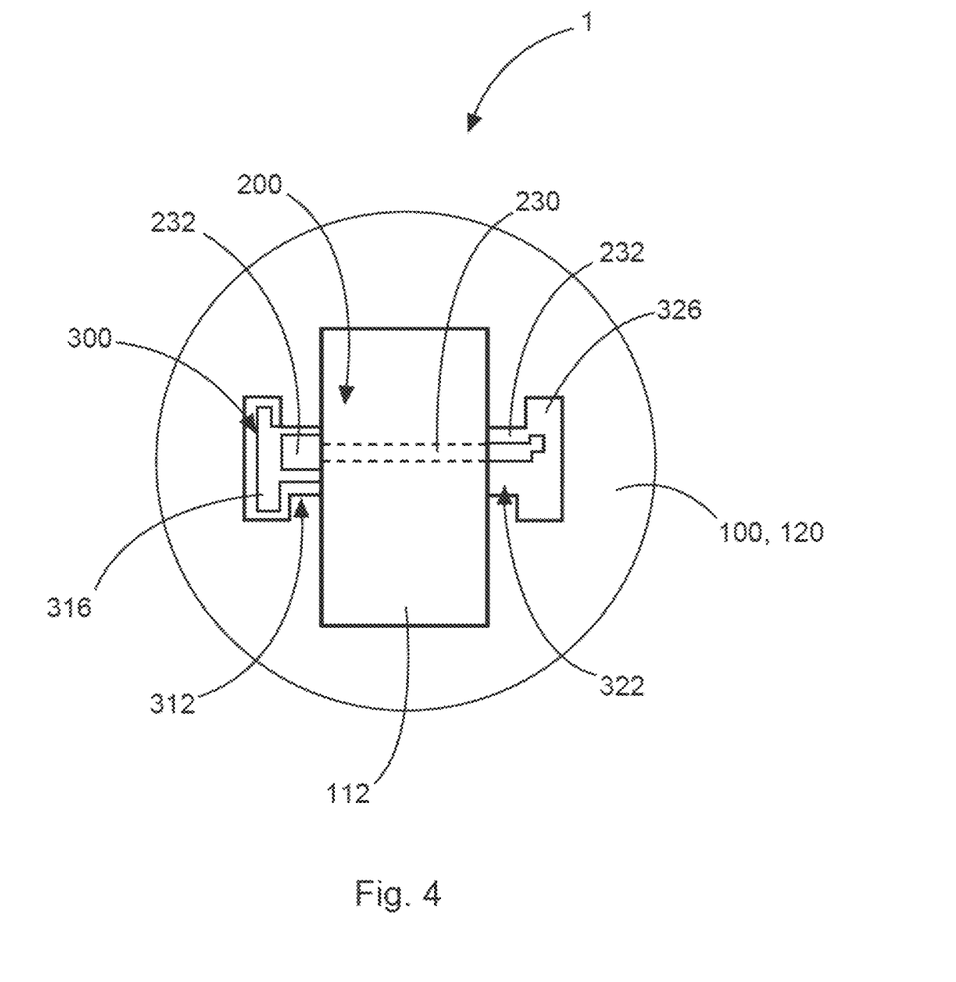
FIG. 4 shows a schematic and exemplary view of the bearing component according to the invention inserted into a housing of a domestic appliance.

FIG. 4 shows a schematic and exemplary view of the flow assembly composed of bearing component 300 and flow sensor 200 inserted into a domestic appliance 1.

The domestic appliance 1 has a housing 100 with a base body 120. An opening 112 provides a path into a fluid channel for insertion of the flow assembly therein. The opening 112 is sealed by a lid (not shown). In order to improve the clarity of the illustration, only the rotary axle 230 of the flow sensor 200 is shown, which extends between the second bearings of the bearing component 300.

It can be seen that only the bearing component 300, which does not rotate, is in contact with the housing 100. The rotary axle 230, on the other hand, is supported exclusively within the bearing component 300 and, accordingly, is able to rotate with low friction. In this embodiment, the arms 310, 320 are inserted into the opening 112 downwardly into the drawing plane. In other embodiments, the bearing component 300 may also have a horizontal design, i.e., in the plane of the drawing.

The final position of the bearing component 300 is fixed by applying the lid. Alternatively, it is also possible to mount the flow assembly in the lid before the latter is put in place in order to seal the opening 112.

The contact surfaces of the bearing component 300 and of the flow sensor 200 may be made of the same material. This is uncommon in such bearing arrangements and is made possible by the polyketone design. Alternative materials for the bearing component 300 include POM.

The brackets or arms of the bearing component 300 and flow sensor 200 may not made of a fiber-reinforced material. In any case, if the second bearings 312, 322 are made of metal, particularly stainless steel or a higher-grade alloy, a fiber-reinforced flow sensor 200 is also advantageous.

Figure 5A:
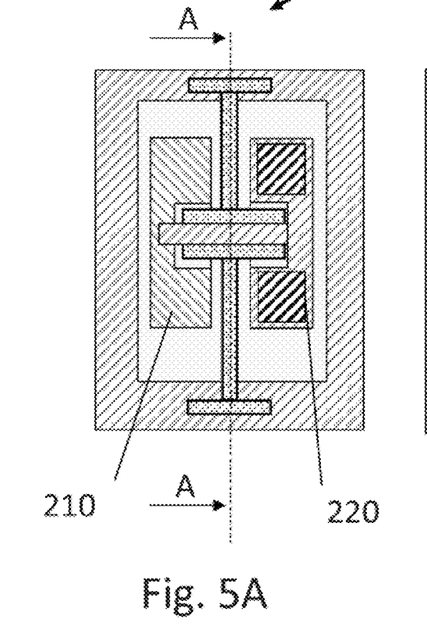
FIG. 5 shows a schematic view of an embodiment of the bearing component.
Figure 5B:
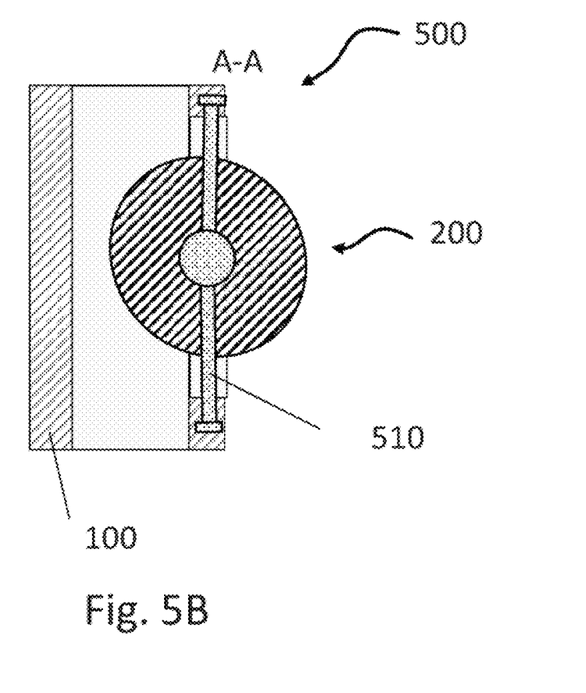

FIGS. 5A and 5B show schematic and exemplary views of another embodiment of a bearing component 500 for supporting a flow sensor 200. A bearing rod 510 having two arms is mounted vertically in the flow sensor 200. The assembly of bearing rod 510 and flow sensor 200 is then mounted into the housing 100 and clamped in place with a lid (not shown).

Figure 6:
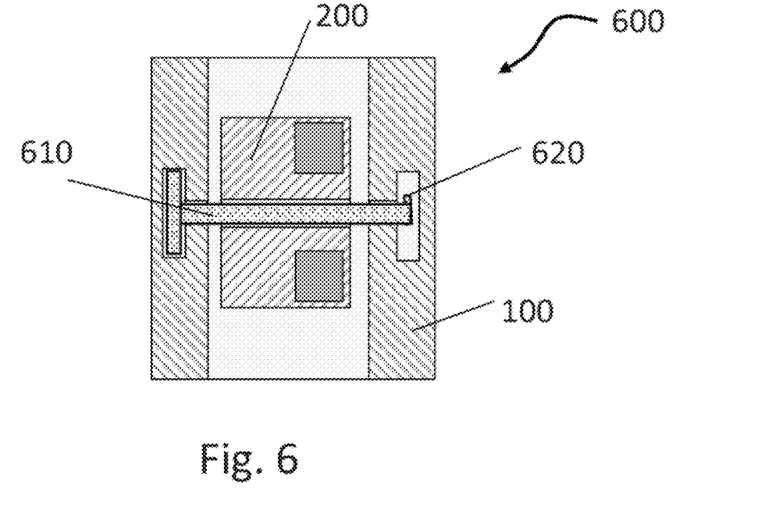
FIG. 6 shows a schematic view of another embodiment of the bearing component.

FIG. 6 shows a schematic and exemplary view of another embodiment of a bearing component 600 of a flow sensor 200. A bearing rod 610 is inserted into the flow sensor 200. A latching hook 620 of the bearing rod 610 prevents the bearing rod 610 from falling out during assembly. The assembly is then mounted into the housing 100 and clamped in place with a lid (not shown.

Figure 7A:
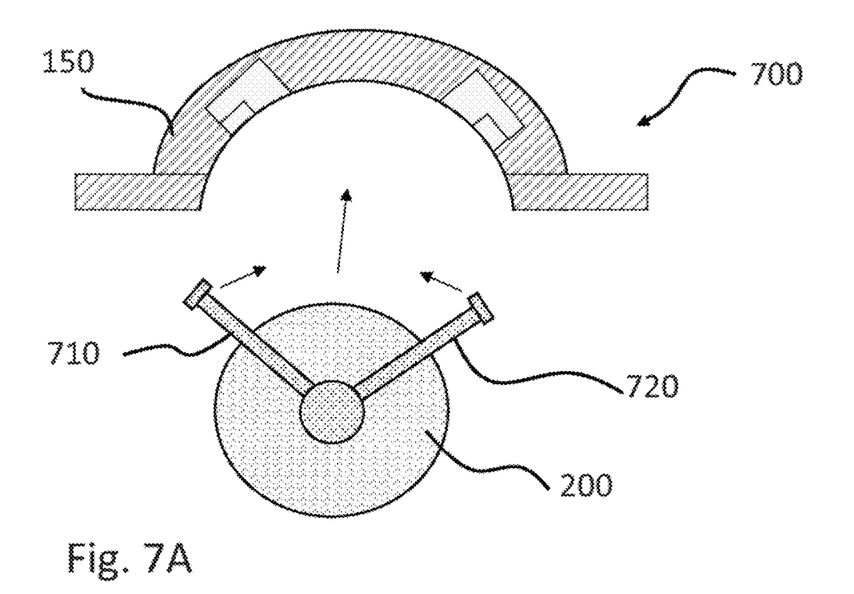
FIG. 7 shows a schematic view of another embodiment of the bearing component.
Figure 7B:
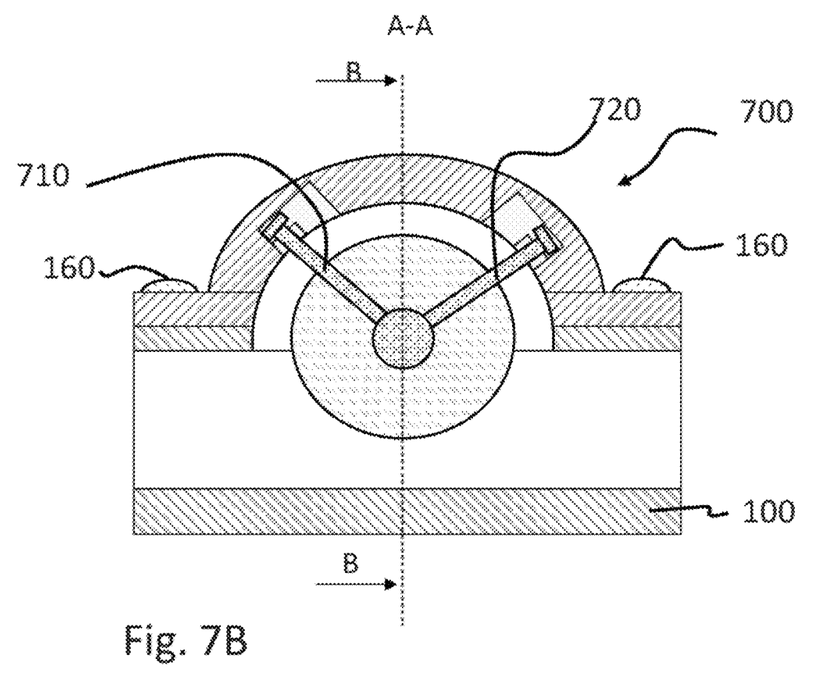
Figure 7C:
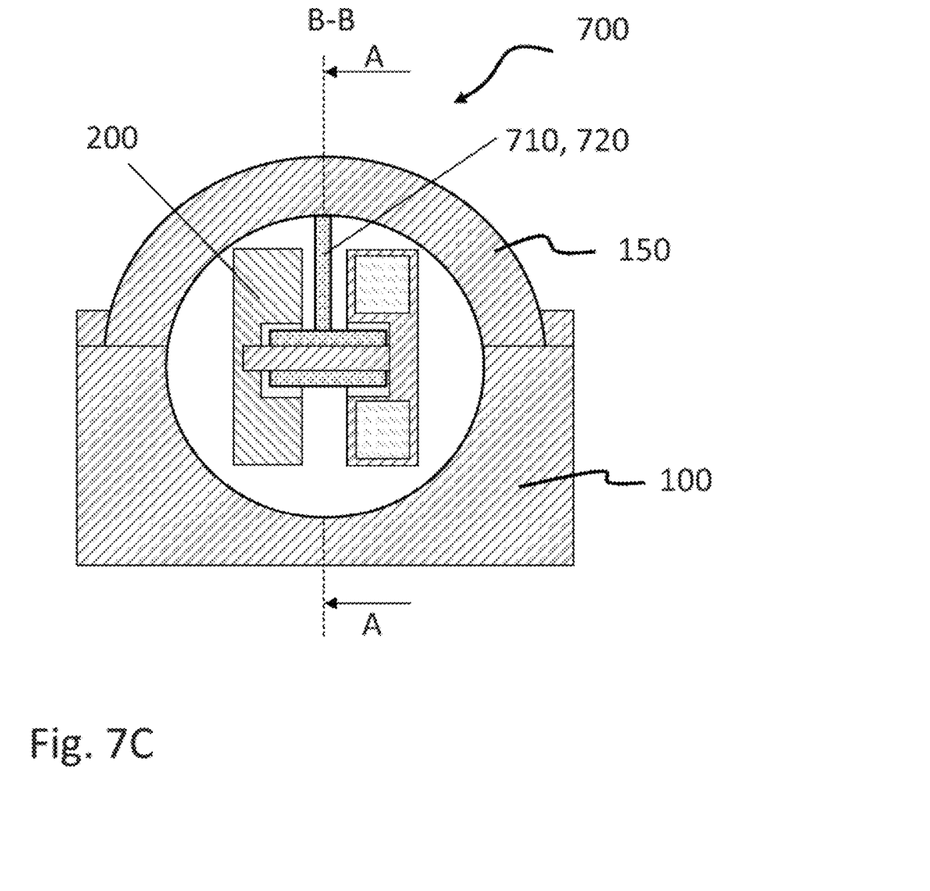

FIGS. 7A-7C shows various schematic and exemplary views of another embodiment of a bearing assembly of a flow sensor 200. In this embodiment, two arms 710, 720 of a bearing component 700 are completed with the flow sensor 200 and clamped into a lid 150. The lid 150 is then connected, particularly screwed using screws 160, to the housing.

Figure 8A:
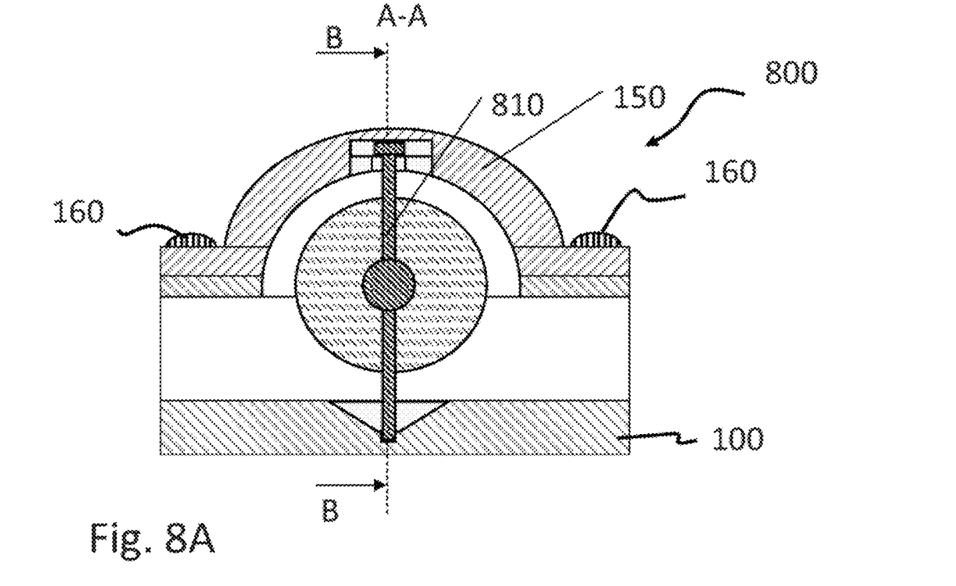
FIG. 8 shows a schematic view of another embodiment of the bearing component.
Figure 8B:
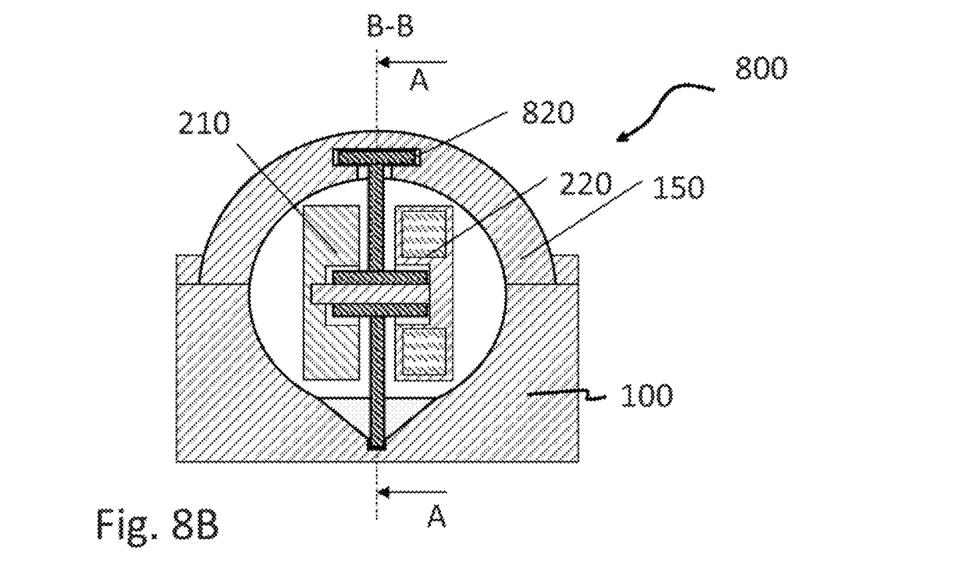
Figure 9A:
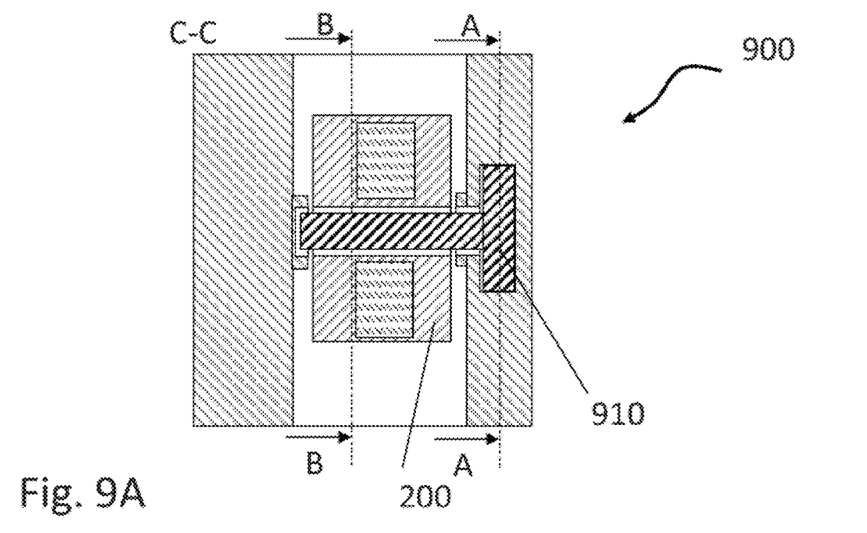
FIG. 9 shows a schematic view of another embodiment of the bearing component.
Figure 9B:
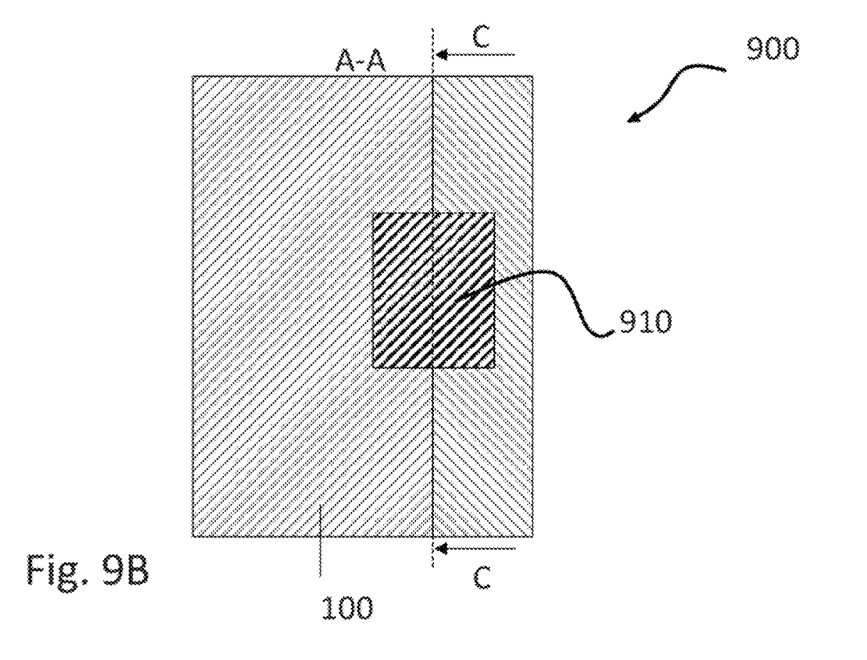
Figure 9C:
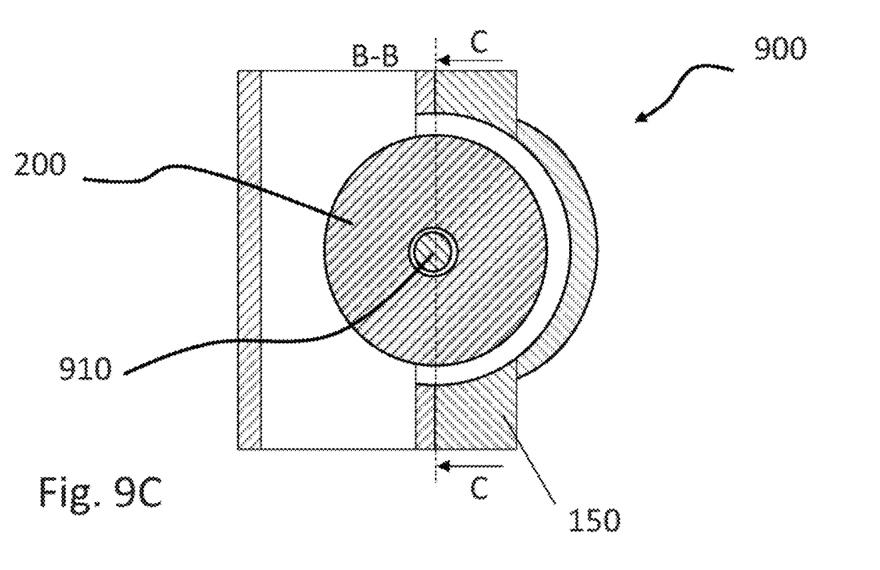
Figure 9D:
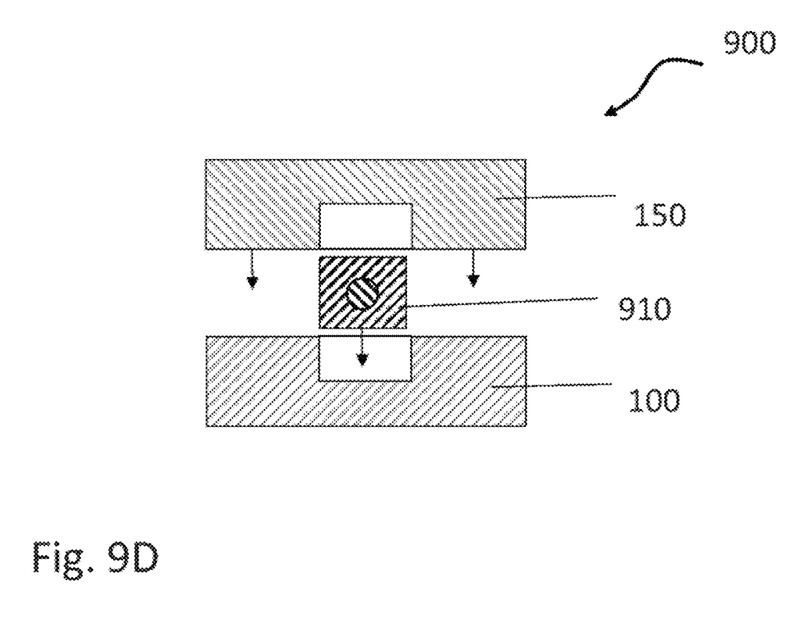

FIGS. 8A-8B show another embodiment of a bearing component 800 embodied as a bearing rod 810 that is prepared for pre-assembly in the lid 150. The bearing component 800 may have a bayonet joint 820 for anchoring in the lid 150. The bearing rod 810 is completed with the flow sensor 200 and then mounted, e.g., screwed with screws 160, onto the housing 100.

FIGS. 9A-9D show another embodiment of a bearing component 900 embodied as a bearing pin 910. Here, the bearing pin 910 has a rectangular cross section, which enables it to be securely clamped between the housing 100 and the lid 150. The bearing pin 910 is inserted into the flow sensor 200 and, together, inserted into the housing 100 before being clamped using a lid 150.

Figure 10A:
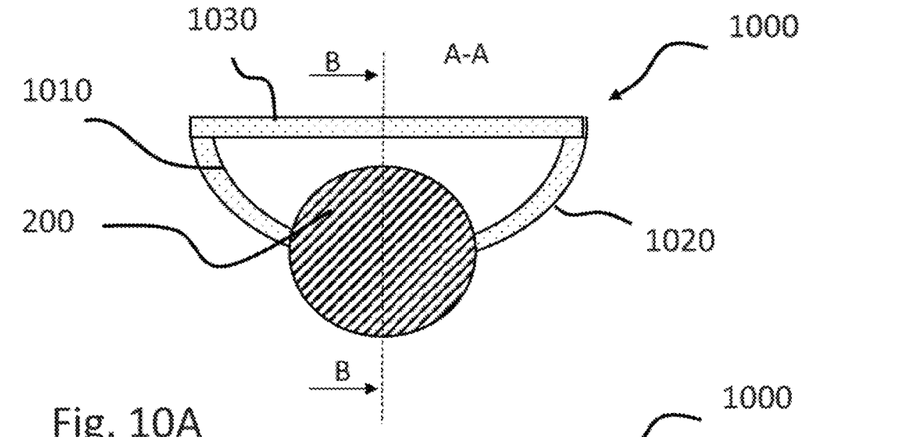
FIG. 10 shows a schematic view of another embodiment of the bearing component.
Figure 10B:
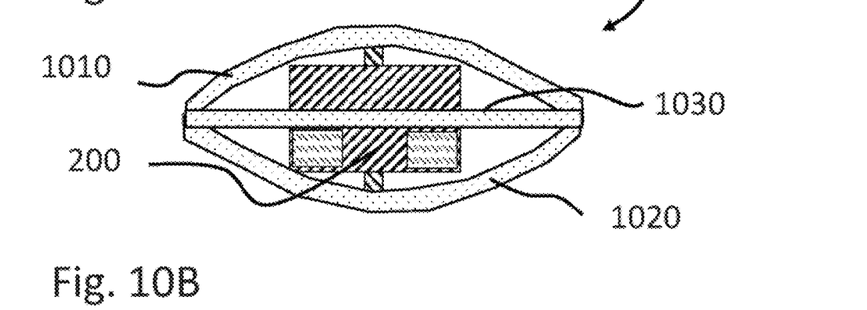
Figure 10C:
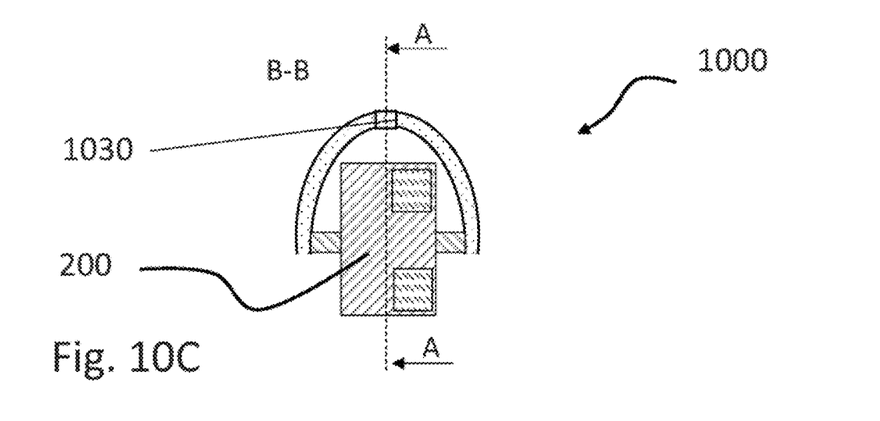

FIGS. 10A-10C show another embodiment of a bearing component 1000 having three flexible arms 1010, 1020, 1030. The arms 1010, 1020 each have a second bearing or, alternatively, a bushing in their center for coupling with a bushing or corresponding second bearing of the flow sensor 200. The respective ends of the arms 1010, 1020, 1030 are connected to one another. By applying force to the ends of the arms 1010, 1020, 1030, the second bearings or first bearings are spread apart at the center of the arms 1010, 1020 in order to allow insertion of the flow sensor 200. When relaxed, the flow sensor 200 is then securely received between the arms. The arm 1030 enables the bearing component 1000 to be clamped in the lid 150. Once clamped in the lid 150, the assembly can then be securely mounted in the housing 100.

Figure 11:
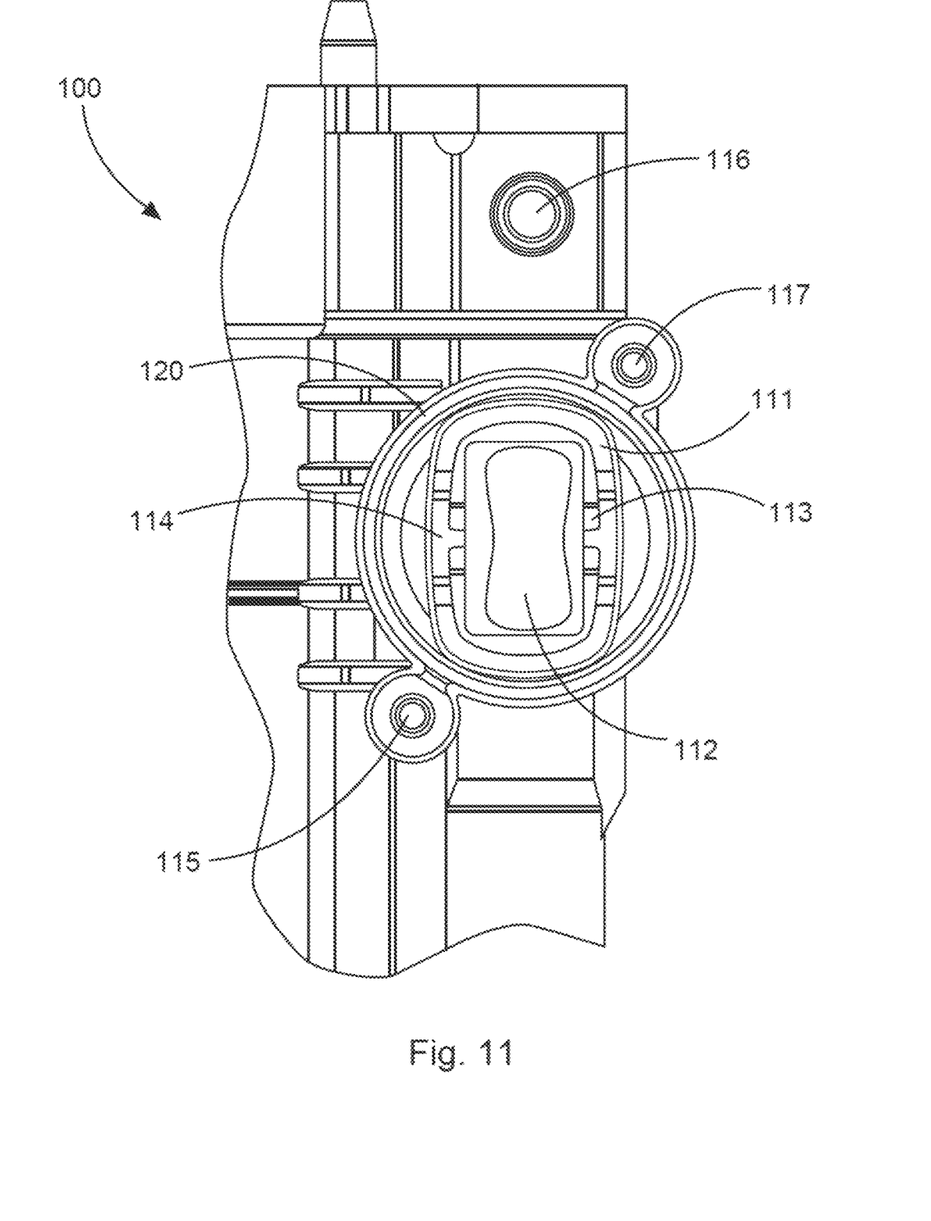
FIG. 11 shows a base body with receptacle for a bearing component.

A receptacle 111 for the bearing component 300 is shown in FIG. 11. A receptacle 111 is disposed around opening 112 and has a space 113, 114 for the fixing collars 316, 326. Fastening devices 115, 117 are used to fasten the lid (not shown) to the base body 120. Additional openings 116, for example for mounting additional sensors, may be provided in the base body 120.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

The invention claimed is:

1. A domestic appliance comprising:
a housing including a base body, a lid, and a channel; and
a flow assembly including:
a bearing component separately formed from the base body and the lid and having a resilient body and opposing first and second bearing projections concentrically arranged on an axis and extending inwardly from the body towards each other along the axis, wherein the bearing component has a relaxed state in which the first and second bearing projections are spaced apart by a first distance measured along the axis and has a tensioned state in which the first and second bearing projections are spaced apart by a second distance measured along the axis that is longer than the first distance, and
a flow sensor supported for rotation about the axis by the first and second bearing projections, the flow sensor having a hollow rotary axle with first and second ends, wherein a length of the axle is greater than the first distance such that the first bearing projection extends into the first end of the hollow axle and the second bearing projection extends into the second end of the hollow axle when the bearing component is in the relaxed state; wherein the length of the axle is less than the second distance so that at least one of the first and second bearing projections does not extend into the hollow axle when the bearing component is in the tensioned state allowing installation of the flow sensor, and the base body or the lid has a receiving space configured to receive the bearing component such that the flow sensor is received in the bearing component and extends at least partially into the channel when the bearing component is received in the receiving space, wherein the base body and the lid fix the position of the body of the bearing component to each other and relative to the channel.

2. The domestic appliance of claim 1, further comprising a fixing collar disposed on the first bearing projection such that the collar is located between the body and the flow sensor, wherein the fixing collar is separately formed from the flow sensor.

3. The domestic appliance of claim 1, wherein the housing contains fiber-reinforced polyamide.

4. The domestic appliance of claim 1, wherein the body includes a first arm joined to the first bearing projection and a second arm joined to the first arm and to the second bearing projection, wherein the arms correspond to an extension of the rotary axle of the flow sensor when the bearing component is in a relaxed state.

5. The domestic appliance of claim 1, wherein the bearing component is symmetrical around the axis.

6. The domestic appliance of claim 1, wherein a material of the flow sensor and of a material of the bearing component are the same.

7. The domestic appliance of claim 6, wherein at least one of the components of the flow assembly contains a polyketone.

8. The domestic appliance of claim 7, wherein the at least one of the components of the flow assembly consists entirely of a polyketone.

9. The domestic appliance of claim 6, wherein the material of the housing is different than the material of the flow sensor and the bearing component.

10. The domestic appliance of claim 9, wherein the housing contains fiber-reinforced polyamide.

11. The domestic appliance of claim 10, wherein the bearing component is formed of a fibreless material.

12. The domestic appliance of claim 1, wherein the flow sensor includes an impeller.

13. The domestic appliance of claim 12, wherein the flow sensor includes a magnet.

14. The domestic appliance of claim 13 further comprising a fixing collar disposed on the first bearing projection such that the collar is located between the body and the flow sensor, wherein the fixing collar is separately formed from the flow sensor.

15. A bearing component of a domestic-appliance flow sensor having a hollow rotary axle, the bearing component comprising:
a resilient body;
opposing first and second bearing projections extending inwardly from the body towards each other, and
a fixing collar received on the first bearing projection such that the bearing projection extends through the fixing collar; wherein
the body has a relaxed state in which the first and second bearing projections are spaced by a first distance configured to place the first and second bearing projections into opposing ends of the hollow axle to support the flow sensor for rotation and has a tensioned state in which the first and second bearing projections are spaced apart by a second distance, that is longer than the axle, configured to place at least one of the first and second bearing projections outside of the hollow axle.

16. The bearing component of claim 15, wherein the body has a first arm joined to the first bearing projection and a second arm joined to the first arm and the second bearing projection and has a third arm joined to the first bearing projection and a fourth arm joined to the third arm and the second bearing projection.

17. A flow assembly for a domestic appliance, the flow assembly comprising:
   a bearing component including a resilient body and opposing first and second bearing projections extending towards each other, wherein the bearing component has a relaxed state in which the first and second bearing projections are spaced apart by a first distance and has a tensioned state in which the first and second bearing projections are spaced apart by a second distance measured that is longer than the first distance;
   a flow sensor supported for rotation about the first and second bearing projections, the flow sensor including a hollow axle that receives the first and second bearing projections therein when the body is in the relaxed state, wherein the second distance is longer than the hollow axle such that at least one of the first and second bearing projections does not extend into the hollow axle when the bearing component is in the tensioned state allowing installation of the flow sensor; and
   a fixing collar disposed on the first bearing projection such that the collar is located between the body and the flow sensor, wherein the fixing collar is separately formed from the flow sensor.

18. The flow assembly of claim 17, wherein a material of the flow sensor and of a material of the bearing component are the same.

19. The flow assembly of claim 17, wherein at least one of the components of the flow assembly contains a polyketone.

20. The flow assembly of claim 17 further comprising a second fixing collar disposed on the second bearing projection such that the collar is located between the body and the flow sensor, wherein the second fixing collar is separately formed from the flow sensor.

* * * * *